United States Patent [19]

O'Neal

[11] 4,037,870
[45] July 26, 1977

[54] APPARATUS FOR TRANSPORTING GLASS PANES

[76] Inventor: John L. O'Neal, 24982 Thompson Road, Perrysburg, Ohio 43551

[21] Appl. No.: 651,848

[22] Filed: Jan. 23, 1976

[51] Int. Cl.² .............................................. B60P 3/00
[52] U.S. Cl. ........................................ 296/3; 105/367; 296/98
[58] Field of Search .................. 296/98, 100, 3, 104; 105/367

[56] References Cited

U.S. PATENT DOCUMENTS

| | | | |
|---|---|---|---|
| 1,318,820 | 10/1919 | Watkins | 296/98 |
| 2,100,971 | 11/1937 | McDonald | 296/3 |
| 2,815,861 | 10/1957 | Schodorf | 296/3 X |
| 2,940,402 | 6/1960 | Hansen | 296/3 |
| 3,848,917 | 11/1974 | O'Neal | 296/3 |

Primary Examiner—Richard J. Johnson
Attorney, Agent, or Firm—Vincent L. Barker, Jr.

[57] ABSTRACT

An improved structure for transporting on a semitrailer large sheets of flat rigid material such as large sheets of flat glass. A generally A-shaped platform having sloped sides is secured over a conventional semitrailer frame. Stacks of the material being transported rest on a plurality of rigid girders which project outwardly from the lower edges of the sloped sides. A novel clamping mechanism is adjustable to engage both edges and the side of each material stack during transport and is removable to facilitate loading and unloading the trailer.

3 Claims, 5 Drawing Figures

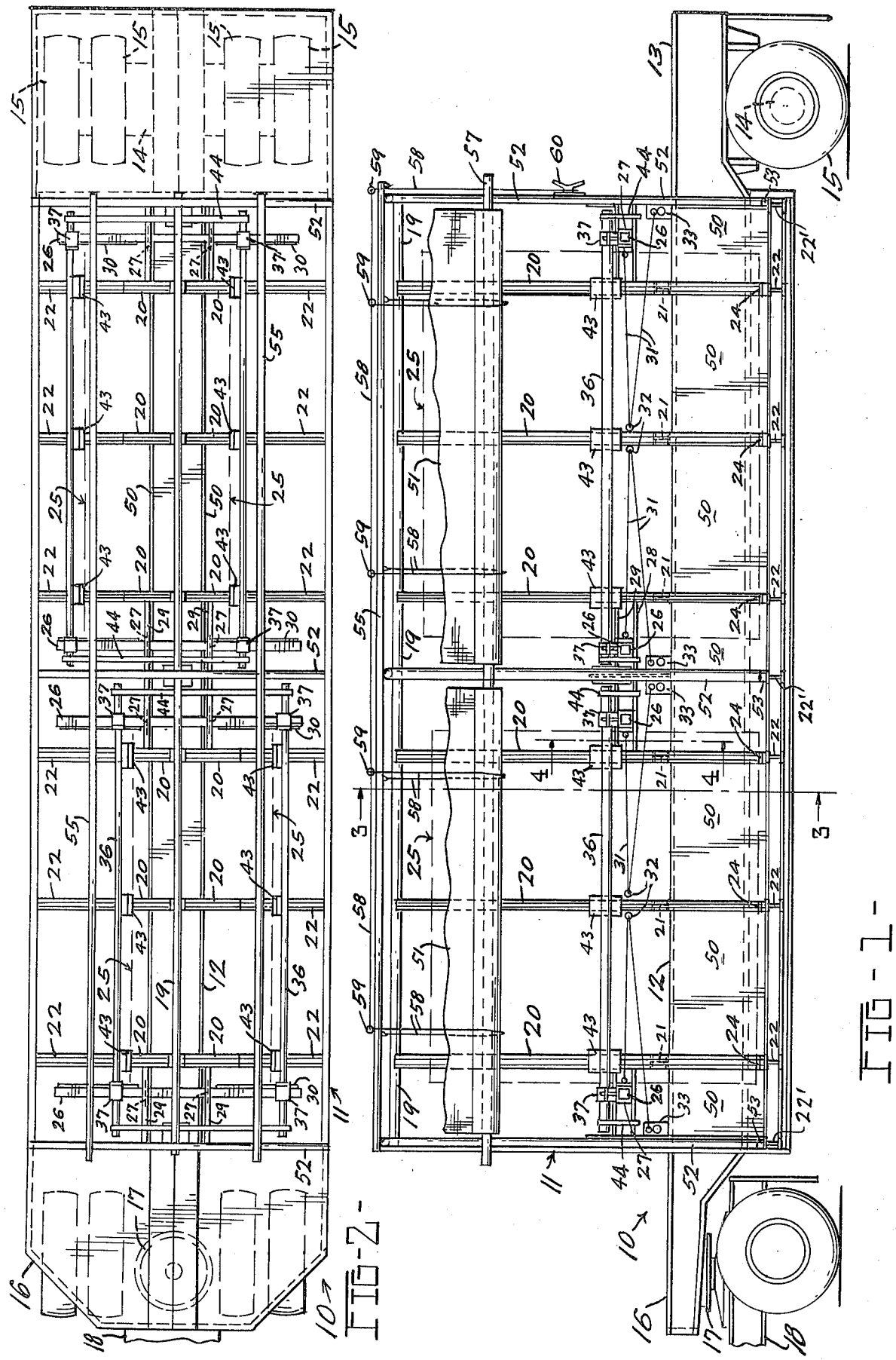

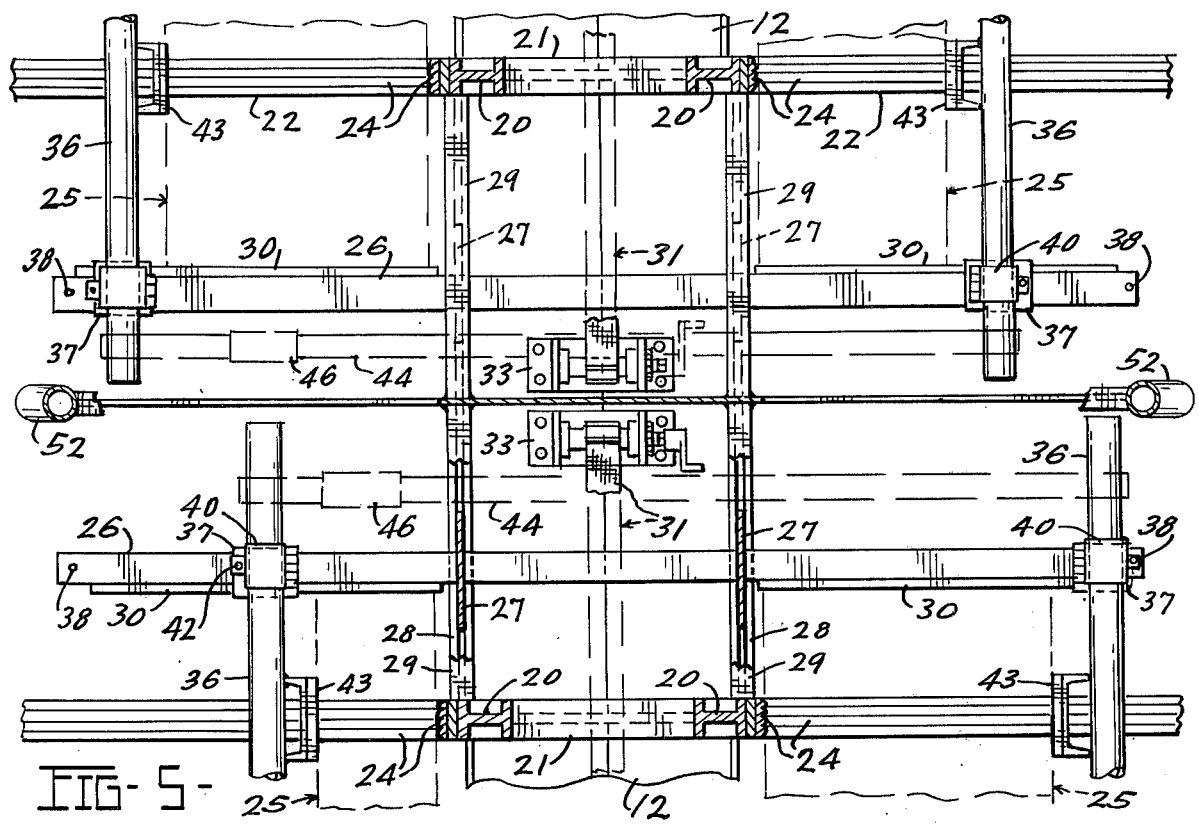
FIG-5-
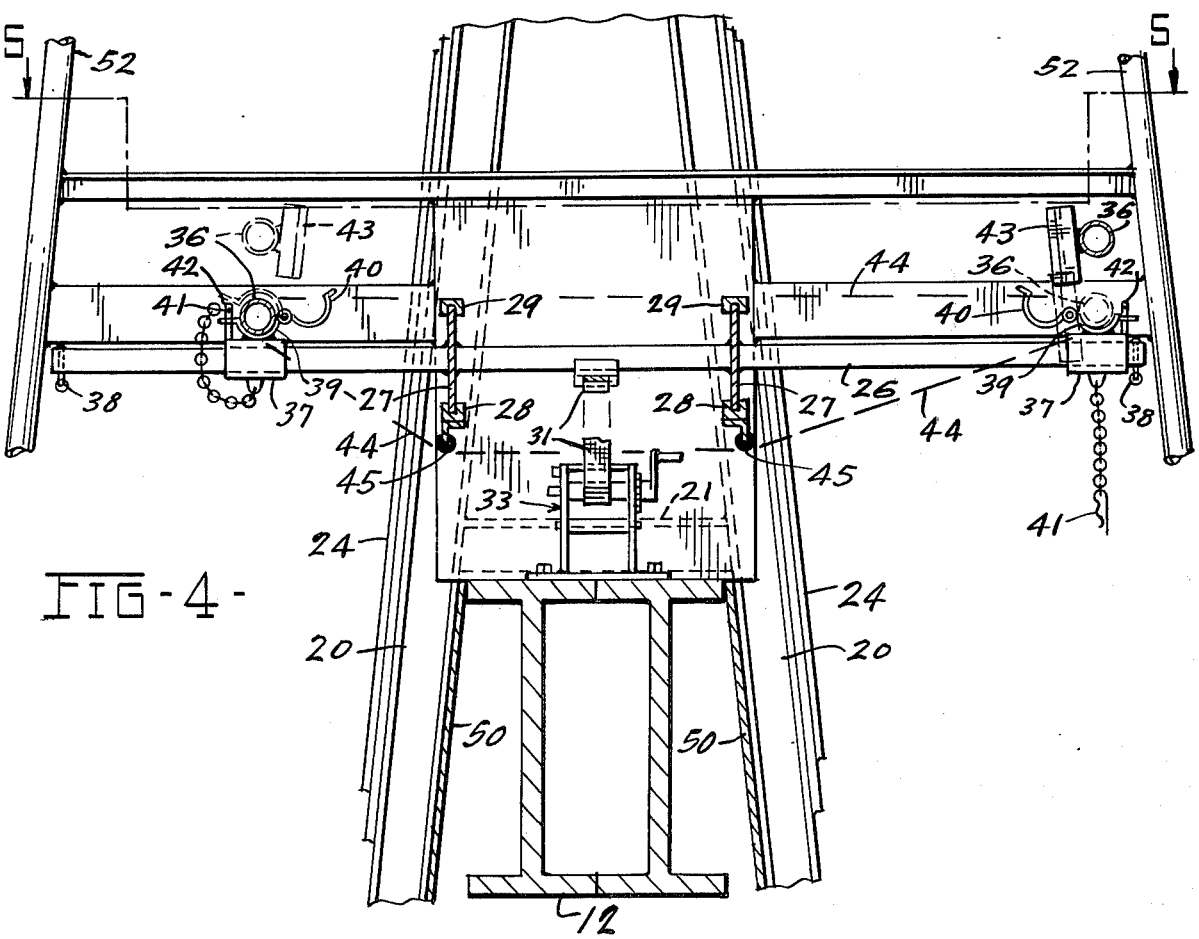
FIG-4-

4,037,870

APPARATUS FOR TRANSPORTING GLASS PANES

BACKGROUND OF THE INVENTION

This invention relates to load carrying land vehicles and more particularly to an improved load retainer for a semitrailer structure for carrying large flat sheets of rigid material such as large sheets of flat glass.

Architectural designs for modern homes, office buildings and the like place considerable emphasis on the use of large sheets of flat glass, either as single sheets or as double insulated sheets. Transportation of large sheets of glass from the place of manufacture to the installation site is a significant cost factor affecting the overall installation costs of such sheets of glass, especially because some breakage in transit is often unavoidable. The only feasible mode of transportation for large sheets of glass is normally by truck. Various types of trucks have been designed in the past for transporting large sheets of glass. In some cases, the glass is transported in a horizontal position. However, this requires extensive crating and packing which reduces the effective payload of the truck and requires added material and labor costs for the glass. Another improved apparatus for transporting large sheets of flat glass is disclosed in my U.S. Pat. No. 3,848,917 which issued on Nov. 19, 1974. This patent discloses a generally A-shaped structure which rests on a conventional semitrailer frame. The large sheets of glass rest against the sloped sides of the A-shaped structure such that they are supported in nearly a vertical orientation. Special clamps are provided for holding the sheets of glass in place during transportation. The clamps pivot from a lower edge of the structure either to rest against the sheets of glass or to rest away from the glass. A cable arrangement is provided for holding the clamps against the glass during shipment. During loading and unloading, the cable is released and the clamps are pivoted away from the sheets of glass. However, the clamps remain attached to the structure and limit access to the glass during loading and unloading. Furthermore, no provision is made for clamping edges of the sheets of glass in place during transportation. Unrestrained edgewise movement of the sheets of glass during transportation may result in breakage.

SUMMARY OF THE INVENTION

According to the present invention, an improved clamping mechanism is provided for a semitrailer mounted structure which supports large sheets of flat rigid material such as glass during transportation. The glass is carried on a structure which is generally A-shaped, having inclined or sloped side walls connected together at upper ends and connected together in an intermediate position through a central web. The central web is secured over a conventional semitrailer frame. Rigid girders project outwardly from the lower edge of the inclined side walls. Stoces or stacks of flat glass sheets rest on the rigid girders and lean against the sides of the A-shaped platform. Adjacent each end of a stack of flat glass sheets, a rail is mounted for movement toward and away from the edge of the stack. The rail has a padded edge which is moved into engagement with the edge of two stacks on opposite sides of the structure and the rail is then held in place by means of a strap attached to a winch. On each end of each rail, a carriage is mounted to move towards and away from the side of the adjacent stack of glass. Between the two carriages at opposite ends of a stack, a clamping bar is attached after the glass is stacked on the trailer. The clamping bar and carriages are then moved until pads on the bar engage the exterior glass surface on the stack. Straps are then passed over the clamping bar at each end of the stack and tightened by means of a winch or toggle mechanism to prevent sideways movement of the glass during transportation of the glass. When the glass reaches its destination, the straps are first removed and then the clamping bar is removed from the carriages. Finally, the rails are moved away from the edges of the stack to permit free side access to the glass for rapid unloading of the semitrailer. A frame also extends over the structure between and adjacent the ends of the stacks of glass sheets. During transportation, a canvas cover is unrolled to extend over the frame for protecting the glass from stones and other missiles thrown up by passing vehicles.

Accordingly, it is an object of the invention to provide an improved structure for supporting large sheets of flat glass and other rigid materials during transportation on a semitrailer.

Another object of the invention is to provide an improved clamping mechanism for holding stacks of flat glass in a substantially vertical position on a semitrailer during transportation while permitting unobstructed access during loading and unloading of the semitrailer.

Other objects and advantages of the invention will become apparent from the following detailed description, with reference being made to the accompanying drawings.

BRIEF DESCRIPTION OF THE DRAWINGS

FIG. 1 is a side elevational view of a semitrailer having mounted thereon a structure for transporting large sheets of flat rigid material and incorporating an improved clamping mechanism in accordance with the present invention;

FIG. 2 is a top plan view of the semitrailer mounted structure of FIG. 1;

FIG. 4 is a fragmentary, cross-sectional view taken along line 4—4 of FIGS. 1 and 2; and FIG. 5 is a fragmentary, cross-sectional view taken along line 5—5 of FIG. 4.

DESCRIPTION OF THE PREFERRED EMBODIMENTS

Figure 3:
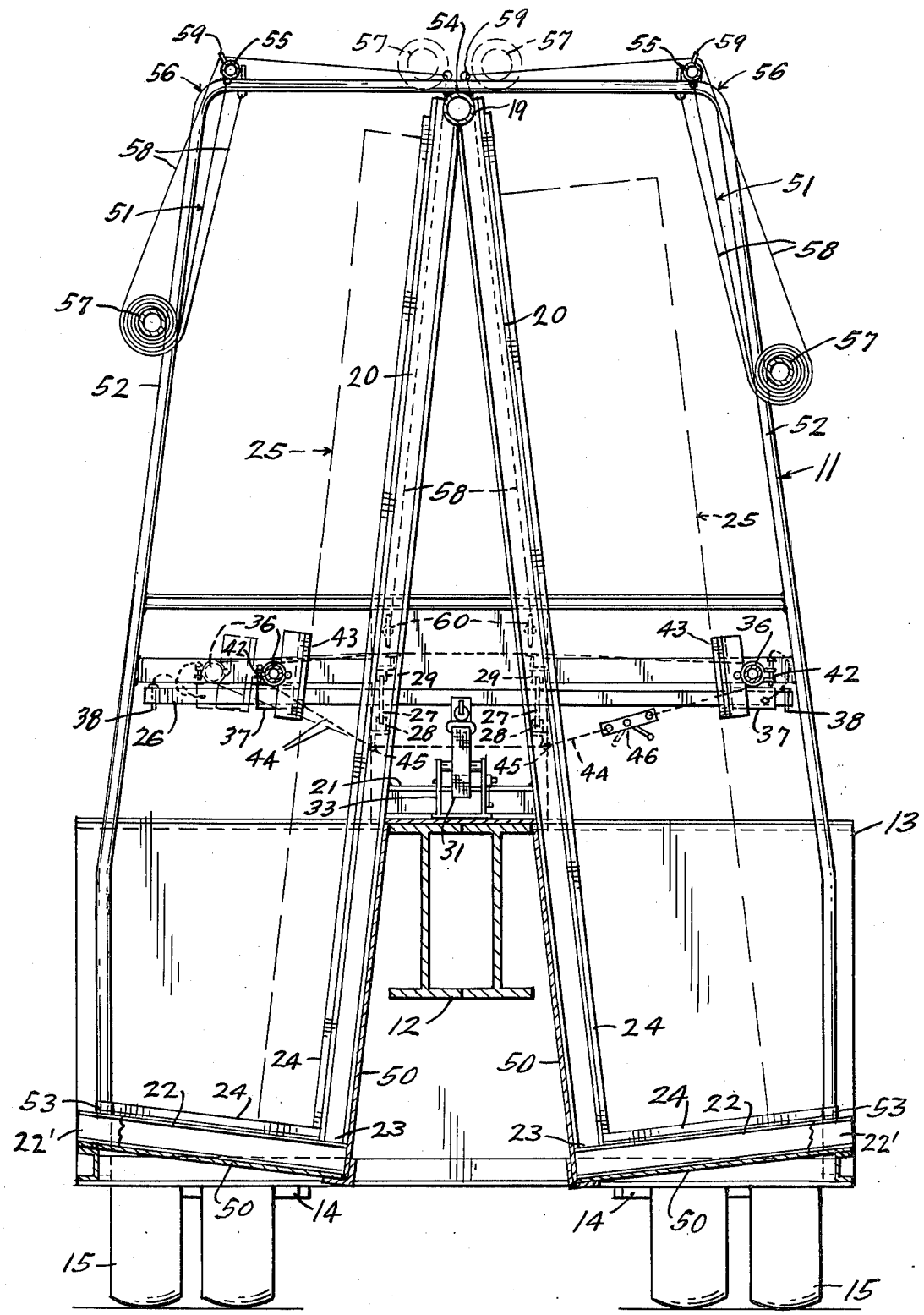
FIG. 3 is a vertical cross-sectional view taken along line 3—3 of FIG. 1.

Turning now to the drawings, and particularly to FIGS. 1 and 2, a semitrailer 10 is shown with a structure 11 mounted thereon for holding large sheets of flat, rigid material such as flat glass during transportation. The semitrailer 10 includes an elongated main frame 12 which may be formed, for example, from a single large I-beam or from two I-beams welded together to form a channel. At one end 13, the frame 12 is adapted to mount one or more axles 14 carrying wheels 15. At the opposite end 16, the frame 12 is connected through a fifth wheel 17 to a cab 18 in a conventional manner.

The structure 11 for supporting the sheets of glass or other similar rigid material during transportation rests upon the main frame 12 between the ends 13 and 16. As best seen in FIGS. 1, 2 and 3, the structure 11 extends along the main frame 12 and has a generally A-shaped cross section. A longitudinal top bar 19 extends the length of the structure 11. Spaced along the top bar 19, pairs of side beams or members 20 slope downwardly and outwardly to either side of the semitrailer main frame 12. A central web 21 is connected between the central portion of the side beams 20 in each pair. The central webs 21 all rest upon the trailer main frame 12 for supporting the structure 11. On each side of the structure 11, the side beams or members 20 define a wall which is slightly sloped, for example, sloped about 5° from the vertical.

An I-beam girder 22 extends substantially perpendicular to and outwardly from a lower end 23 of each side beam 20. Padding 24, such as an extruded rubber padding, extends along the outer edge of the side beams 20 and the girders 22 for protecting the glass or other material being transported on the structure 11. During transportation, large flat sheets of glass 25 or other similar rigid flat materials are placed upon the structure 11 in a substantially vertical orientation with the lower edge of the glass 25 resting upon a plurality of the girders 22 (three shown for each stack) and the flat sides resting against a plurality of the side beams 20. As best seen in FIG. 2, the structure 11 is adapted to carry four stacks of the glass 25: a stack on each side of the front half of the structure 11 and a stack on each side of the rear half of the structure 11. Preferably, each stack contains glass of the same size, although the glass size may vary in a stack and between stacks. Of course, it will be appreciated that it is also desirable to balance the load on either side of the semitrailer 10.

The structure 11 is designed such that it may be loaded directly from the sides, without interference from clamping apparatus which holds the stacks of glass 25 in place during transportation. After the glass 25 is stacked on the structure 11, edges of the stacks are clamped in place to prevent longitudinal movement of the glass and the outermost piece of glass in each stack is clamped to apply pressure towards the adjacent side beams 20.

As seen in FIGS. 1, 2, 4 and 5, the edges of the glass 25 in each stack are clamped between rails 26 during transportation. Each of four rails 26 extends across the structure 11 for simultaneously clamping edges of two opposed stacks of the glass 25. Two plates 27 are attached in parallel near the center of each rail 26. A U-shaped channel 28 engages the lower edge of each plate 27 and a U-shaped channel 29 engages the upper edge of each plate 27. The channels 28 and 29 are all parallel and extend lengthwise down the structure 11 a distance to provide a desired amount of movement of the rail 26. Edge pads 30 are mounted on the rails 26 for engaging and protecting the sides of the stacks of glass 25. During loading and unloading of the glass 25, the rails 26 are moved to their extreme position to provide a maximum spacing adjacent the glass. After the glass 25 is loaded upon the structure 11 for transportation, the rails are moved to a position wherein the pads 30 contact the edges of the stacks of glass 25. A web strap 31 is connected from each rail 26 over an associated pulley 32 to a winch 33. The winches 33 are operated to wind up and tighten the straps 31, pulling the rails 26 against the edges of the glass 25. The winches 33 are then left in the tightened position during transportation to prevent edgewise movement of the glass 25. After the glass 25 reaches its final destination, the winches 33 are released, the straps 31 are loosened and the rails 26 are moved to their maximum positions to permit free access for removing the glass 25.

The glass 25 in each stack is clamped against the frame side beams 20 by clamping bars 36. Mounted on each of the two opposed ends of each rail 26 are carriages 37. Each carriage 37 is free to move towards and away from the adjacent wall defined by the side beams 20 and is retained upon the rail 26 by a stop 38, such as a bolt or pin. Each carriage 37 includes a half sleeve 39 permanently mounted thereon. After the glass 25 is placed upon the structure 11, a clamping bar 36 is positioned between the two carriages 37 on opposite sides of the stack of glass 25. The clamping bar 36 is set in the half sleeves 39 on such carriages 37 and is releasably attached to the carriages 37 by moving a second hinged half sleeve or shackle 40 over the top of the clamping bar 36 and inserting a hairpin cotter 41 into a pin 42 to lock the shackle 40 in place. The carriages 37 holding the clamping bar 36 are then moved towards the stack of glass 25 until pads 43 attached to the clamping bar 36 engage the exterior surface of the stack of glass 25. The pads 43 are spaced directly opposite at least some of the side beams 20 for pressing the glass against such side beams 20.

After the clamping bars 36 are moved into contact with the stacks of sheets of glass 25, they are held in place by means of webbed straps 44, as best seen in FIGS. 3 and 5. At each end of the clamping bars 36, a strap 44 passes over the ends of two bars 36 on opposite sides of the trailer and under a padded lower edge 45 of the lower channels 28 supporting the adjacent rail 26. Ends of each strap 44 are connected together by means of a ratchet or toggle mechanism 46 which tightens the strap 44. Thus attached, the straps 44 urge the clamping bars downwardly and against the outermost piece of glass 25 in the stacks on opposite sides of the structure 11. After the glass is transported to its destination, the strap 44 is removed, the clamping bars 36 are removed from the carriages 37, the straps 31 are loosened at the ratchet 33 and the rails 26 are moved to their maximum position. Free access is then provided for removing the glass 25 from the structure 11.

During transportation, it is desirable to protect the stacks of glass sheets 25 from dirt and flying missiles, such as stones thrown up by vehicle tires. Metal plate shields 50 are shown as extending below the girders 22 and on the inside of the portion of the side beams 20 below the trailer frame 12 for the length of the structure 11. The shields 50 protect the lower edges of the stacked glass 25 from dirt and stones thrown up by the rear truck wheels 15 or wheels on the cab 18. The outermost piece of glass 25 in each stack is protected by means of canvas covers 51. Three bows or tubular frames 52 are attached to the structure 11 for supporting the canvas covers 51. One of the bows 52 is located at each end of the structure 11, while the remaining bow 52 is positioned at an intermediate point between two stacks of glass 25. The bows 52 are formed from a curved tube or pipe and have ends 53 attached to girders 22' and having an upper center point 54 attached to the bar 19. Pipes 55 also extend the length of the structure 11 and are removably attached to the three bows 52 adjacent upper corners 56. The canvas covers 51 have an end attached to the pipes 55 and the other end is wrapped around a pipe 57. Lines 58 extend from the pipes 55 around the covers 51, over pulleys 59 to suitable cleats 60 at one end of the structure 11. The lines 58 function for rolling up and unrolling the canvas cover 51 similar to a conventional porch awning. Prior to transporting glass on the structure 11, the canvas covers 51 are unrolled by releasing the lines 58 from the cleats 60. When the glass 25 is to be loaded onto or unloaded from the structure 11, the lines 58 are pulled to roll up the canvas cover 51 and are then attached to the cleat 60 to hold the covers 51 at their uppermost position.

It will be appreciated that the above-described preferred embodiment of a structure for carrying large sheets of glass on a semitrailer has great advantages over the prior art in that the improved clamping structure is movable completely out of the way during loading and unloading of the structure. Furthermore, the structure 11 is trouble-free and easily adjusted for different sized stacks of glass and similar types of rigid flat material. In the above description, the rails 26 have been described as extending across the structure 11 for engaging edges of the glass 25 for two opposed stacks. This arrangement either necessitates stacking glass of the same width opposite each other on the structure 11 or results in an edge on one of two opposed stacks failing to be clamped. It will be appreciated that the rails on one side of the structure 11 may be constructed to be totally independent of the rails on the other side to permit clamping different width stacks on opposite sides of the structure. In addition to the improved clamping mechanism, the structure 11 is provided with an improved cover for protecting the material during transportation from damage caused by flying missiles such as stones. Various modifications and changes to the above-described preferred embodiment will be apparent to those skilled in the art and may be made without departing from the spirit and the scope of the following claims.

What I claim is:

1. An improved structure for supporting stacks of one or more pieces of flat rigid sheet material on a semitrailer having a rigid main frame extending lengthwise of the semitrailer, said structure comprising a generally A-shaped frame having a plurality of pairs of opposed sloping side members extending downwardly to terminate below the level of said trailer main frame and a plurality of rigid internal webs joining said side members in each pair together at an intermediate position, said webs resting upon said main frame to support the entire structure on said semitrailer, means connecting said side members together at their top edges, said side members defining a sloped wall on each side of said structure, a plurality of load supporting girders, one girder extending outwardly from the lower end of each side member to provide a load supporting floor on each side of said structure, said structure supporting stacks of the flat material with edges of the material resting upon said floors and sides of the material resting against said sloped walls, and means for releasably clamping each stack for preventing movement of the material away from the sloped wall and for preventing edgewise movement of the material, said clamping means including a plurality of rail means each extending across said structure for simultaneously engaging an edge of each of two stacks of material supported on opposite sides of said structure, means mounting said rail means for movement in a direction lengthwise of the semitrailer into engagement with and away from side edges of each stack, releasable means for holding said rail means in contact with edges of such stacks whereby such stacks are restrained from edgewise movement, a plurality of carriages mounted to move on said rail means in a direction toward and away from said sloped walls, one of said carriages being mounted on each end of each of said rail means, a plurality of clamping bars, means releasably attaching each clamping bar to two carriages positioned adjacent opposite edges of a stack of the flat material, each clamping bar having a length greater than the maximum spacing between the two carriages to which it is releasably attached, whereby each clamping bar is moveable with the attached carriages to a position wherein the portion of such clamping bar between such carriages is in abutment with the sides of a different stack and each clamping bar is removable from the attached carriages to permit access to the stacks for loading and unloading, and releasable means for holding such portions of said clamping bars in contact with the sides of such stacks whereby such stacks of the flat material are restrained from movement away from the sloped walls.

2. An improved structure for supporting stacks of one or more pieces of flat rigid sheet material on a semitrailer having a rigid main frame extending lengthwise of the semitrailer, said structure comprising a generally A-shaped frame having a plurality of pairs of opposed sloping side members extending downwardly to terminate below the level of said trailer main frame and a plurality of rigid internal webs joining said side members in each pair together at an intermediate position, said webs resting upon said main frame to support the entire structure on said semitrailer, means connecting said side members together at their top edges, said side members defining a sloped wall on each side of said structure, a plurality of load supporting girders, one girder extending outwardly from the lower end of each side member to provide a load supporting floor on each side of said structure, said structure supporting stacks of the flat material with edges of the material resting upon said floors and sides of the material resting against said sloped walls, and means for releasably clamping each stack for preventing movement of the material away from the sloped wall and for preventing edgewise movement of the material, said clamping means including a plurality of clamping bars, one clamping bar for each stack of the material and each clamping bar having a length greater than the maximum width of material stacks to be clamped by such bar, means for releasably attaching said clamping bars to said structure with at least a portion of a clamping bar spanning each stack of the material, said releasable attaching means including means for moving each clamping bar toward the adjacent sloped wall into contact with the outer surface of the stack of material spanned by such clamping bar, and releasable restraining means for preventing movement of said clamping bar away from such adjacent sloped wall.

3. An improved structure for supporting stacks of one or more pieces of flat rigid sheet material on a semitrailer, as set forth in claim 2, wherein said clamping means further includes edge clamping means adjacent opposed side edges of each stack, means for moving said edge clamping means into engagement with and away from such side edges, and releasable means for holding said edge clamping means in contact with edges of such stacks whereby such stacks are restrained from edgewise movement.

* * * * *